US012694498B2

(12) United States Patent
Chen

(10) Patent No.: US 12,694,498 B2
(45) Date of Patent: Jul. 28, 2026

(54) DETECTION SYSTEM FOR DETECTING UNDERBODY OF VEHICLE

(71) Applicant: HON HAI PRECISION INDUSTRY CO., LTD., New Taipei (TW)

(72) Inventor: Chin-Wei Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/926,811

(22) Filed: Oct. 25, 2024

(65) Prior Publication Data

US 2025/0272814 A1 Aug. 28, 2025

(30) Foreign Application Priority Data

Feb. 27, 2024 (CN) .......................... 202410211916.5

(51) Int. Cl.
*G06T 7/00* (2017.01)
*H04N 7/18* (2006.01)
*H04N 23/90* (2023.01)

(52) U.S. Cl.
CPC ........... *G06T 7/0002* (2013.01); *H04N 7/188* (2013.01); *H04N 23/90* (2023.01)

(58) Field of Classification Search
CPC ...... G06T 7/0002; H04N 23/90; H04N 7/188; G06V 10/764; G06V 20/52; G06V 2201/07; G06V 10/82; G06V 10/25; G06V 20/56; G06V 20/70; G06V 10/774; G06V 20/10

USPC ......................................................... 348/159
See application file for complete search history.

(56) References Cited

U.S. PATENT DOCUMENTS

2016/0100087 A1* 4/2016 Scheich ................ G06T 1/0007
348/47
2021/0396684 A1* 12/2021 Tissandier ......... G01N 21/8806
2021/0398271 A1* 12/2021 Lee .......................... G06T 7/001

FOREIGN PATENT DOCUMENTS

CN 108645350 A 10/2018
CN 211784304 U 10/2020
CN 215491558 U 1/2022
CN 117191833 A 12/2023

* cited by examiner

*Primary Examiner* — Masum Billah
(74) *Attorney, Agent, or Firm* — ScienBiziP, P.C.

(57) ABSTRACT

A detection system includes at least one bottom collecting module disposed on a ground. The bottom collecting module is configured to face to an underbody of the vehicle and collect an underbody image of the vehicle. A processing module is configured to determine whether the underbody of the vehicle is in an abnormal state based on the underbody image of the vehicle. When the vehicle drives through the bottom collecting module, the bottom collecting module facing to the underbody of the vehicle collects the underbody image of the vehicle. A detection frequency of the underbody of the vehicle is increased, a detection time of the underbody of the vehicle is saved, and a driver may notice the abnormal of the underbody of the vehicle in time, and a safety hazard is avoided.

14 Claims, 7 Drawing Sheets

<u>1</u>

DETECTION SYSTEM FOR DETECTING UNDERBODY OF VEHICLE

TECHNICAL FIELD

The present application generally relates to vehicle detection technology, and particular to a detection system for detecting an underbody of a vehicle.

BACKGROUND

Currently, with the popularity of the vehicles, vehicles have become one most common used of transportation in people's travel. During use of the vehicles, vehicles exist phenomenon, such as an abrasion, a corrosion, a deformity, an aging, and so on, with an extension of usage or an increased driving distance. Thus, the vehicles need to regularly maintenance, or when an abnormal is existed during use of the vehicle, the vehicles is detected, fixed, and processed in a maintenance manufacturer. But, when the abnormal is occurred on important parts of a underbody of the vehicles, such as a chassis, tires, and so on, such as an oil leak of the chassis, abnormal tread on tire, and so on, a driver usually is unable to notice the abnormal in a short time, therefore a potential safety hazard is existed during the driver drives the vehicles.

There is room to for improvement in the art.

BRIEF DESCRIPTION OF THE DRAWINGS

Implementations of the present application will now be described, by way of example only, with reference to the attached figures.

DETAILED DESCRIPTION

In description of any embodiment of the application, the terms "for example" is sued to represent an example, an illustration, or a description. Any embodiments or design scheme described as "exemplary" or "for example" in the embodiments of this application should not be explained as being more preferred or having more advantages than another embodiment or design scheme. In particular, the terms such as "exemplary" and "example" as used herein are intended to present the related concepts in a specific manner.

Unless otherwise defined, all technical and scientific terms used herein have the same meaning as commonly understood by those skilled in the technical field of the present application. The terminology used in the specification of the present application herein is for the purpose of describing specific embodiments only, and is not intended to limit the present application. It is understood that, the term "the plurality" refers to two or more. In addition, technical features of one embodiment may be beneficially combined with one or more other embodiments, unless explicitly denied.

Figure 1:
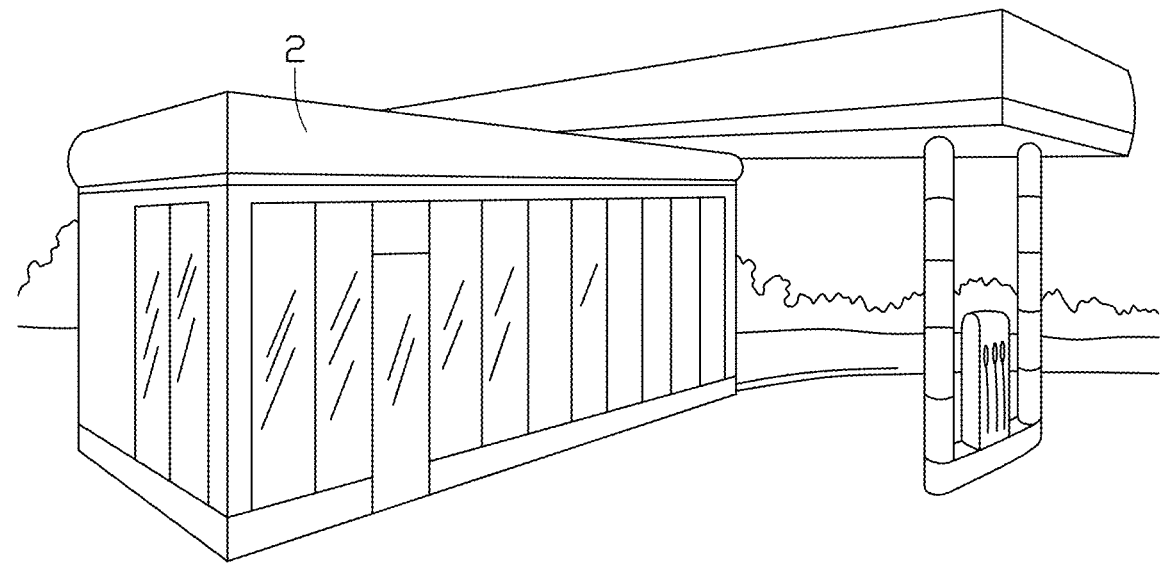
FIG. 1 is a diagram illustrating an embodiment of an application scenario of a detection system for detecting an underbody of a vehicle according to the present application.
Figure 1:
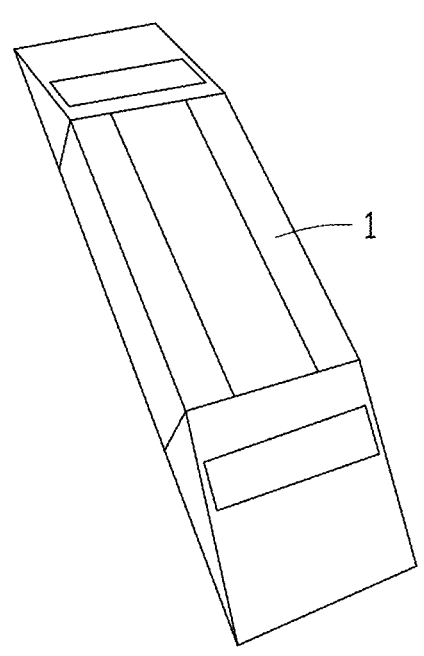

Referring to FIG. 1, FIG. 1 is a diagram of an embodiment of an application scenario of a system for detecting an underbody of a vehicle. The system 1 may be disposed at a place where the vehicles frequently entrance and exit. For example, a petrol station 2 as shown in FIG. 1. The petrol station 2 is a single entry. The system 1 may be any one system 1 in a first to fifth embodiments. In one embodiment, the detection system 1 is disposed at an entrance of the petrol station 2 or an entrance of each single entry of the petrol station 2. It is understood that, the detection system 1 may be disposed on other places where the vehicle frequently entrances and exits, such as a charging station, a parking lot, and so on. Before entrancing the petrol station 2, the vehicle firstly drives by the detection system 1 mounted on the single entry. The detection system 1 may collects an underbody image of the vehicle. The underbody image of the vehicle may include a chassis image and tire images of the vehicle, and so on. The detection system 1 may determines that whether the underbody of the vehicle is in an abnormal state based on the underbody image. In some embodiments, after a refueling of the vehicle is completed, the detection system 1 generates a detection report indicating whether the underbody of the vehicle is in an abnormal state. Therefore, after the refueling of the vehicle is completed, the detection report is provided to the driver of the vehicle, a detection frequency of the underbody of the vehicle is increased, a detection time of the underbody of the vehicle is saved, and the driver may notice the abnormal of the underbody of the vehicle in time, and a safety hazard is avoided.

Figure 2:
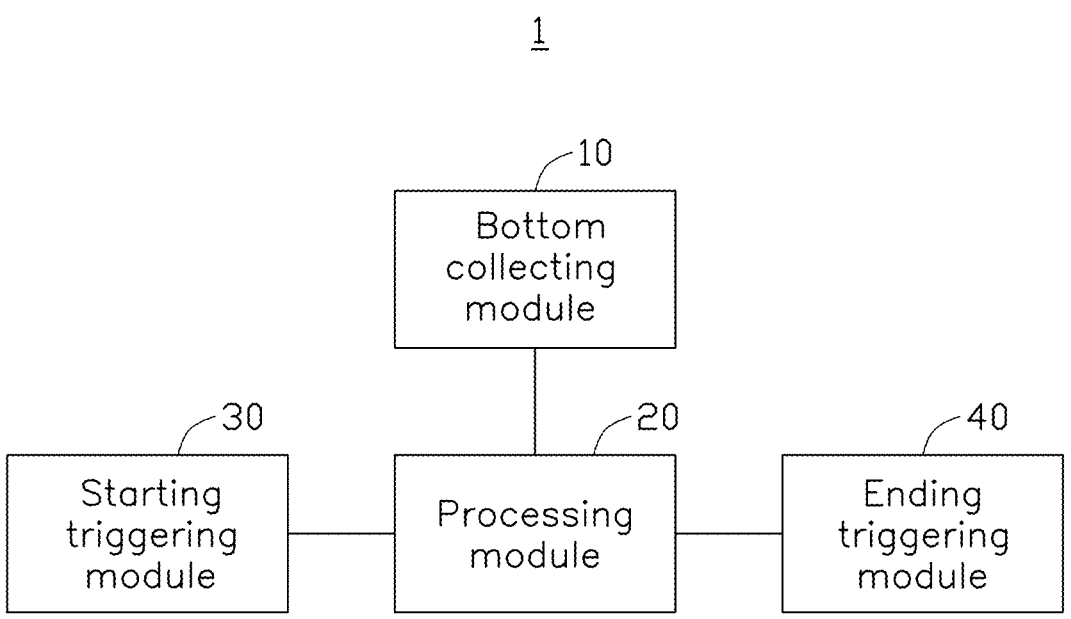
FIG. 2 is a diagram illustrating a first embodiment of a detection system for detecting an underbody of a vehicle according to the present application.
Figure 3:
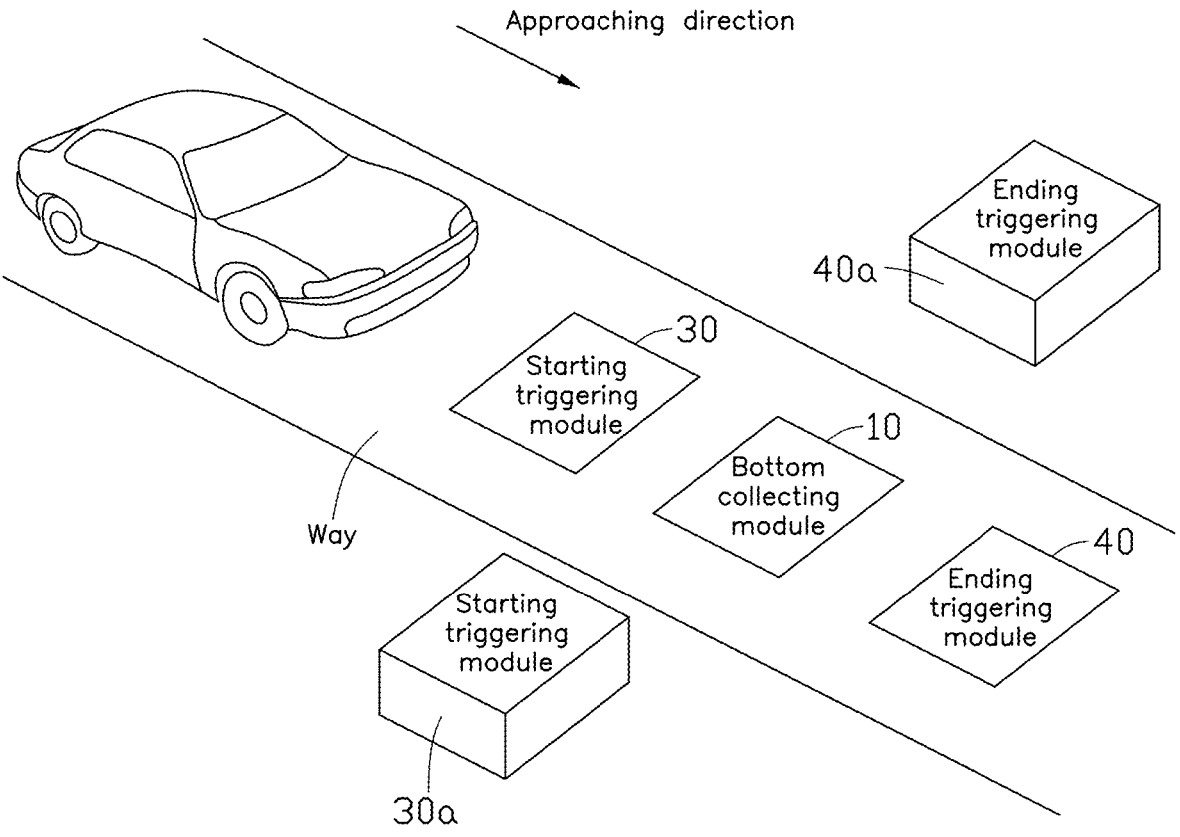
FIG. 3 is a diagram illustrating an embodiment of a detection system for detecting an underbody of a vehicle in one application scenario according to the present application.

Referring to FIGS. 2 and 3, FIG. 2 is a diagram showing a first embodiment of a structure of the detection system 1, and FIG. 3 is a diagram showing the detection system 1 in one application scenario. The detection system 1 may include a bottom collecting module 10 and a processing module 20. The bottom collecting module 10 communicates with the processing module 20 in a wired manner, for example, using a cable for establishing a communication link, or in a wireless manner, for example, using BLUETOOTH or local area network (LAN) for establishing a wireless communication connection. The bottom collecting module 10 faces to the underbody of the vehicle and collects the underbody image of the vehicle. In detail, the bottom collecting module 10 is disposed on a ground. The ground refers not only a road, an urban road, a backroad, and so on, but also refers to an entry of a place where the vehicle is capable of driving on, for example, as the above recited entry of petrol station 2. There are several bottom collecting modules. The plurality of bottom collecting modules 10 are disposed along a approaching direction of the vehicle to the detection system 1 in a sequence. The bottom collecting module 10 may include a first signal receiving terminal (not shown) (which may be a camera). The first signal receiving terminal on the bottom collecting module 10 is perpendicular to a road surface of the way. When the vehicle drives to the bottom collecting module 10, the first signal terminal may receive a signal emitted or reflected by the underbody of the vehicle. The first signal terminal also may be disposed on the bottom collecting module 10 with an angle of which may be adjusted. When the vehicle is nearby, and is distanced from the bottom collecting module 10 within a first predefined distance, the first signal terminal may receive the signal emitted or reflected by the underbody of the vehicle. It is understood that, according to positions of parts to-be-collected in the underbody of the vehicle, the angle of the first signal terminal in the bottom collecting module 10 is adjusted for collecting images of the parts. The bottom collecting module 10 may include a light-sensitive camera (the light-sensitive camera set with a photosensor using an optical image principle) or an infrared camera (the infrared camera set with an infrared sensor using an infrared image principle), and so on. It is understood that, after the signal emitted or reflected by the underbody of the vehicle entrances into the bottom collecting module 10, the bottom collecting module 10 generates the underbody image of the vehicle. The underbody image of the vehicle may include a chassis image and tire images of the vehicle, and so on.

The processing module 20 may be disposed on the way, or be disposed on a remote server. The processing module 20 may include hardware, such as a storage medium and a control chip. The processing module 20 is configured to determine whether the underbody of the vehicle is in an abnormal state based on the underbody image. In detail, the processing module 20 receives one or more underbody images transmitted by the bottom collecting module 10, and determines whether the underbody of the vehicle is in the abnormal state based on the one or more underbody images. For example, it determines that whether each underbody image is the same as a predefined underbody image by comparing. When the underbody image is the same as the predefined underbody image, it determines that the underbody of the vehicle is in a normal state. When the underbody image is not the same as the predefined image, it determines that the underbody of the vehicle is in the abnormal state. Or, the underbody images form a bottom model of a partial of the vehicle or a whole vehicle. For example, a tire model is formed based on the tire images, and a chassis model is formed based on the chassis image. It determines that whether the chassis model is the same as a predefined chassis model by comparing. When the chassis model is the same as a predefined chassis model, it determines that the underbody of the vehicle is in a normal state. When the chassis model is not the same as a predefined chassis model, it determines that the underbody of the vehicle is in the abnormal state. For example, the processing module 20 identifies that there is a foreign inserted into the tire based on the tire image and determines the tire in the abnormal state. The processing module 20 identifies an oil leakage of the chassis based on the chassis image and determines the chassis in the abnormal state.

It is understood that, when the vehicle passes through the bottom collecting module 10, the signals emitted or reflected by the underbody of the vehicle enters into the bottom collecting module 10, different signals are received by the first signal terminal according to the movement of the vehicle, and different underbody images are generated according to the different signals. The vehicle also may be stopped on the bottom collecting module 10. The bottom collecting module 10 moves for adjusting angles with the underbody of the vehicle for receiving different signals of the underbody of the vehicle, and different underbody images are generated according to the different signals. The processing module 20 determines that whether the underbody of the vehicle is in the abnormal state based on the different underbody images.

Therefore, when the vehicle passes through the bottom collecting module 10, the bottom collecting module 10 facing to the underbody of the vehicle collects the underbody image of the vehicle, the processing module 20 determines the state of the underbody of the vehicle based on the underbody image. A detection frequency of the underbody of the vehicle is increased, a detection time of the underbody of the vehicle is saved, and the driver may notice the abnormal of the underbody of the vehicle in time, and a safety hazard is avoided.

Referring to FIGS. 2 and 3, the detection system 1 further includes a starting triggering module 30 and an ending triggering module 40. The starting triggering module 30 and the ending triggering module 40 are communicated with the bottom collecting module 10 in a wired manner or a wireless manner. The starting triggering module 30 is configured to generate a first triggering signal by sensing the vehicle being closed to the bottom collecting module 10. The ending triggering module 40 is configured to generate a second triggering signal by sensing the vehicle being away from the bottom collecting module 10. Both of the starting triggering module 30 and the ending triggering module 40 may be a pressure sensor, an infrared sensor, or a camera, and so on.

In one embodiment, the bottom collecting module 10 includes a terminal (which is a first terminal) which the vehicle moves towards to, and another (which is a second terminal) which the vehicle moves away from. The starting triggering module 30 is disposed at the first terminal which the vehicle moves towards to, and the ending triggering module 40 is disposed at the second terminal which the vehicle moves away from. Both of the starting triggering module 30 and the ending triggering module 40 include a second signal receiving terminal (not shown) (which may be a camera). The second signal receiving terminal is perpendicular to the road surface of the ground and is disposed on the starting triggering module 30 and the ending triggering module 40. When the vehicle drives to the starting triggering module 30 or the ending triggering module 40, the starting triggering module 30 or the ending triggering module 40 senses the signal emitted or reflected by the underbody of the vehicle. The second signal receiving terminal also may be angled with the surface of the ground at a first predefined angle, and is disposed on the starting triggering module 30 or the ending triggering module 40. The first predefined angle is less than 90 degrees. When the vehicle is nearby, and is distanced from the starting triggering module 30 or the ending triggering module 40 within a second distance range, the starting triggering module 30 or the ending triggering module 40 senses the signal emitted or reflected by the underbody of the vehicle. In another embodiment, the starting triggering module 30a is disposed on a road infrastructure or a roadside, which is distanced from the first terminal at a third distance, and towards to a road surface of the first terminal which the vehicle moves towards to. The starting triggering module 30a may face to a point of the road surface, which is distanced from the first terminal at a fourth distance. The ending triggering module 40a is disposed on a road infrastructure or a roadside, which is distanced from the second terminal at the third distance, and towards to a road surface of the second terminal which the vehicle moves away from. The ending triggering module 40*a* may face to a point of the road surface, which is distanced from the second terminal at the fourth distance.

It is understood that, when the starting triggering module 30 or the ending triggering module 40 is the infrared sensor, and the like, the second distance range and the fourth distance range is a sensing range of the starting triggering module 30 or the ending triggering module 40. When the vehicle drives and enters the sensing range of the starting triggering module 30, the starting triggering module 30 generates the first triggering signal. When the starting triggering module 30 is the pressure sensor, the vehicle drives along the approaching direction to be at the starting triggering module 30, the starting triggering module 30 senses a pressure and generates the first triggering signal when the sensed pressure reaches a predefined pressure threshold. The bottom collecting module 10 collects the underbody image of the vehicle in response to the first triggering signal. It is understood that, by setting the starting triggering module 30, the time of the vehicle being going to enter the bottom collecting module 10 is detected in time, for making the bottom collecting module 10 to collect the underbody image of the vehicle. When the vehicle drives away the bottom collecting module 10, and enters the sensing range of the ending triggering module 40, the ending triggering module 40 generates the second triggering signal. When the ending triggering module 40 is the pressure sensor, the vehicle drives on the ending triggering module 40, the ending triggering module 40 senses a pressure and generates the second triggering signal when the sensed pressure reaches the predefined pressure threshold. The bottom collecting module 10 stops collecting the underbody image of the vehicle in response to the second triggering signal. It is understood that, by setting the ending triggering module 30, the time of the vehicle being going to away from the bottom collecting module 10 is detected in time, for making the bottom collecting module 10 to stop collecting the underbody image of the vehicle.

Figure 4:
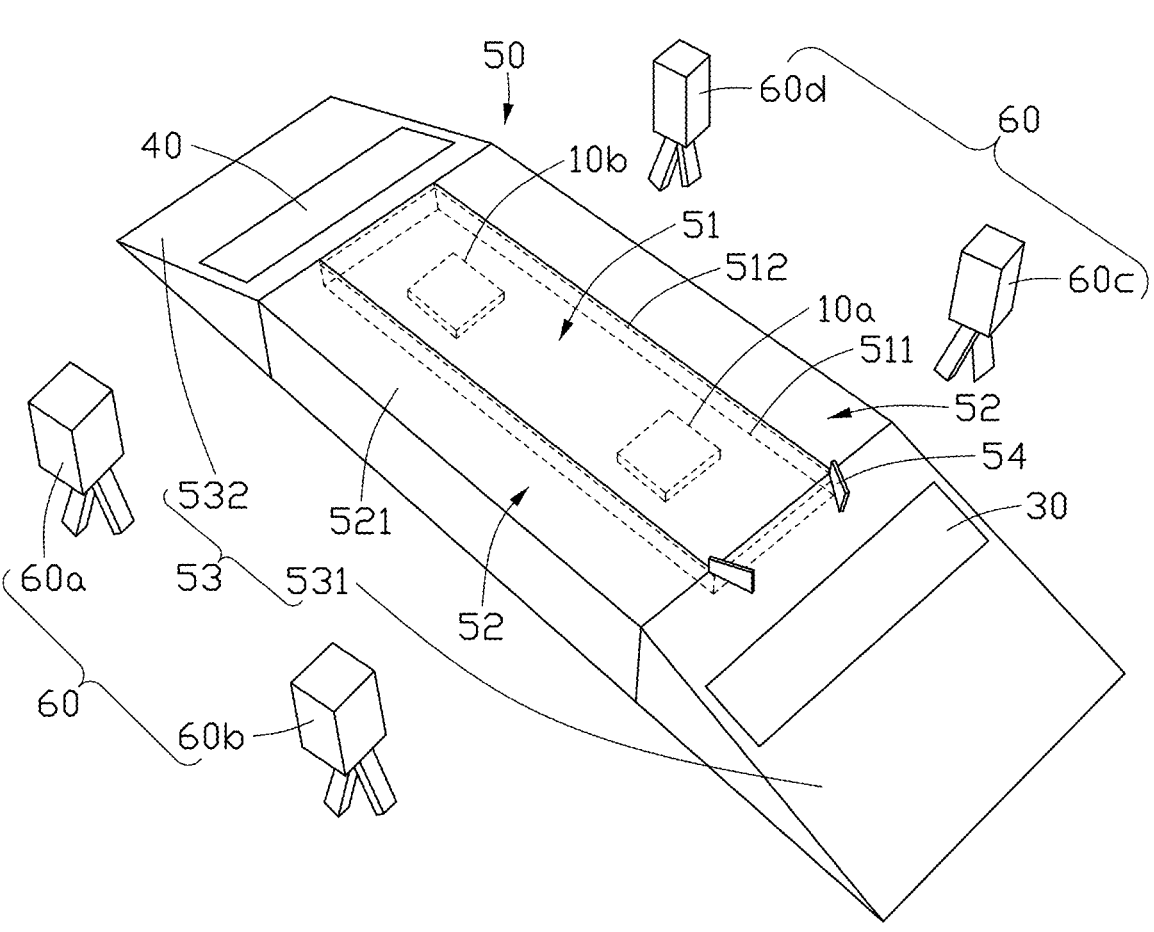
FIG. 4 is a diagram illustrating a second embodiment of a structure of a detection system for detecting an underbody of a vehicle in one application scenario according to the present application.

Referring to FIG. 4, FIG. 4 shows a diagram of a second embodiment of a structure of the detection system 1. By comparing with the first embodiment of the detection system 1, the detection system 1 of the second embodiment further include a detection platform 50. The detection platform 50 is disposed on the way. All of the bottom collecting module 10, the starting triggering module 30, and the end triggering module 40 are disposed on the detection platform 50. The detection platform 50 defines a first region 51 and two second regions 52. The first region 51 is disposed between the two second regions 52. The bottom collecting module 10 is disposed in the first region 51. The second regions 52 are configured to support tires on two sides of the vehicle. The first region 51 defines a first slot 511. The second region 52 includes a projection portion 521. In detail, the detection platform 50 sets two first projection portions 521 respectively along the approaching direction of the tires on two sides of the vehicle. Supporting surfaces of the two first projection portions 521 are coplanar with each other, for making the vehicle to passing through the detection platform 50 smoothly. A concave between the two projection portions 521 forms the first slot 511. The plurality of the bottom collecting modules 10 are disposed in the first slot 511 along the approaching direction of the vehicle. The signal emitted or reflected by the underbody of the vehicle enters into the first slot 511 and further enters into the first signal receiving terminal of the bottom collecting module 10. The first region 51 also may include a first cover 512. The first cover 512 is covered on the first slot 511, and the cover 512 is movably connected with an edge formed the first slot 511, for preventing other objects entering into the first slot 511. A surface of the first cover 512 away from the first slot 511 is coplanar with the supporting surface of the first projection portion 521. The first cover 512 may be a transparent cover or a non-transparent cover. The transparent first cover 512 is made of reinforced glass. The un-transparent first cover 512 defines a through hole opposite to the first signal receiving terminal. A transparent portion is disposed in the through hole. The transparent portion is made of reinforced glass, and the like. The first signal receiving terminal receives the signal emitted or reflected by the underbody of the vehicle through the through hole or the transparent first cover 512.

The detection platform 50 also may include a driving assisting portion 53. A terminal of the driving assisting portion 53 is connected with the second region 52, and another terminal of the driving assisting portion 53 is connected with the road surface of the way, for making wheels of the vehicle entering or exiting the second region 52 through the driving assisting portion 53. In one embodiment, the driving assisting portion 53 includes an entrance assisting portion 531 and an exit assisting portion 532. A terminal of the entrance assisting portion 531 is fixedly connected or removably connected with a terminal of the second region 52 (which is a third terminal) which the vehicle moves towards to, and another terminal of the entrance assisting portion 531 is connected with the road surface. The exit assisting portion 532 is fixedly connected or removably connected with a terminal of the second region 52 (which is a fourth terminal) which the vehicle moves away from. In one embodiment, both of the entrance assisting portion 531 and the exit assisting portion 532 are substantially slope. A terminal of the slope is connected with the second region 52, and another terminal of the slope is connected with the road surface. The slope is fixedly connected or removably connected with the second region 52. In another embodiment, both of the entrance assisting portion and the exit assisting portion 532 are a plate. A terminal of the plate is fixedly connected or removably connected with the second region 52, and another terminal of the plate is connected with the road surface.

It is understood that, by setting the entrance assisting portion 531, the vehicle may smoothly drive from the road surface into the second region 52. By setting the exit assisting portion 532, the vehicle may smoothly drive from the second region 52 into the road surface.

The starting triggering module 30 also may be disposed on the entrance assisting portion 531 or embedded in the entrance assisting portion 531, for making the starting triggering module 30 to generate the first triggering signal by a pressure or a sensing signal when the vehicle drives through the entrance assisting portion 531. The ending triggering module 40 also may be disposed on the exit assisting portion 532 or embedded in the exit assisting portion 532, for making the ending triggering module 30 to generate the second triggering signal by a pressure or a sensing signal when the vehicle drives through the exit assisting portion 532.

The third terminal of the second region 52 also may set with a wheel assisting portion 54. The wheel assisting portion 54 is configured to guide the wheel to enter into the second region 52. In one embodiment, a terminal point of the third terminal adjacent to the first region 51 (which is a first terminal point) is fixedly connected or removably connected with the wheel assisting portion 54. A second predefined angle is formed between a terminal of the wheel assisting portion 54 and a terminal of the first region 51 which the vehicle moves towards to. The second predefined angel is less than 90 degrees, for increasing an end surface where the wheel entrances into the second region 52, an end surface of the where the vehicle entrances into the first region 51 is decreased, therefore, the wheel of the vehicle is easily entranced into the second region 52. The wheel assisting portion 54 is substantially in a tape shape, or in a rectangular shape. For example, when the wheel assisting portion 54 is substantially in a trapezoid shape, an upper end of the trapezoid is connected with the first terminal point, and a bottom end of the trapezoid is suspended in midair upon on the entrance assisting portion 531.

The detection system 1 may further include side collecting modules 60. The side collecting modules 60 are symmetrically disposed on two sides of the detection platform 50, and are configured to collect the underbody image of the vehicle from the sides of the vehicle. In detail, the difference between the side collecting modules 60 and the bottom collecting module 10 is that the side collecting module 60 collects the underbody image of the vehicle from the sides of the vehicle. The side collecting module 60 sets with a signal receiving terminal (which is a third signal receiving terminal). The third signal receiving terminal may be fixedly or be adjustably disposed on the side collecting module 60. A height of the side collecting module 60 is coplanar with top surfaces of the wheels of the vehicle, for making the third signal receiving terminal to collect the wheel images of the complete wheels of the vehicle. In each wheel arranged in a row, each vehicle includes a surface facing to another wheel in a same row (which is a second surface), and another surface facing away from the another wheel in a same row (which is a third surface). There are several side collecting modules 60. The side collecting modules 60 are divided into two teams. The side collecting modules 60 in each team may face to two ends of the second region 52 of the detection platform 50, and is disposed exterior to the detection platform 50, for collecting the wheel images of the four wheels of the vehicle. It is understood that, by comparing with the bottom collecting module 10, the side connection module 60 may collects the images of more parts of the wheel at the third surface.

In an application scenario, the vehicle entrances into the entrance assisting portion 531, the vehicle drives to the starting triggering module 30, the first triggering signal is generated when the pressure received by the starting triggering module 30 is larger than the predefined pressure. The bottom collecting modules 10a, 10b in the first region 51, and the side collecting modules 60a, 60b, 60c, 60d collect the underbody images of the vehicle in response to the first triggering signal. According to the moving of the vehicle, collection angles are adjusted for collecting the underbody images of the vehicle. For example, after the wheels of the vehicle approaching the second region 52 with the assistance of the wheel assisting portion 54, and the vehicle is in a first position (the wheels in a front row are roughly disposed on two ends of the side collecting module 60a), the side collecting modules 60a and 60d and the bottom collecting module 10b collect images of a tire pattern of a front end of each wheel in a front row, and the side collecting modules 60a and 60d further collect images of parts of the tire pattern and a spoke of each wheel in the front row from the third surface. The side collecting modules 60b and 60c collect the images of the complete tire pattern and the complete spoke of each wheel in the front row from the third surface. The bottom collecting module 10a collects an image of a front section of the chassis of the vehicle and the images of the tire pattern and the spoke of each wheel in the front row from the second surface. When the vehicle is at a second position (the wheels in a back row are roughly disposed on two ends of the side collecting module 60a), the bottom collecting module 10b collects an image of a front section of the chassis of the vehicle and the images of the tire pattern and the spoke of each wheel in the front row from the second surface. The side collecting modules 60a and 60d collect the images of the complete tire pattern and the complete spoke of each wheel in the front row from the third surface. The bottom collecting module 60a collects an image of a back section of the chassis of the vehicle and the images of the tire pattern and the spoke of each wheel in the back row from the second surface. The side collecting modules 60b and 60c collect the images of the complete tire pattern and the complete spoke of each wheel in the back row from the third surface.

When the vehicle approaching the exit assisting portion 532, the vehicle drives to the ending triggering module 40, the second triggering signal is generated when the pressure received by the ending triggering module 30 is larger than the predefined pressure. The bottom collecting modules 10a, 10b in the first region 51, and the side collecting modules 60a, 60b, 60c, 60d stop collecting the underbody images of the vehicle in response to the second triggering signal.

Figure 5:
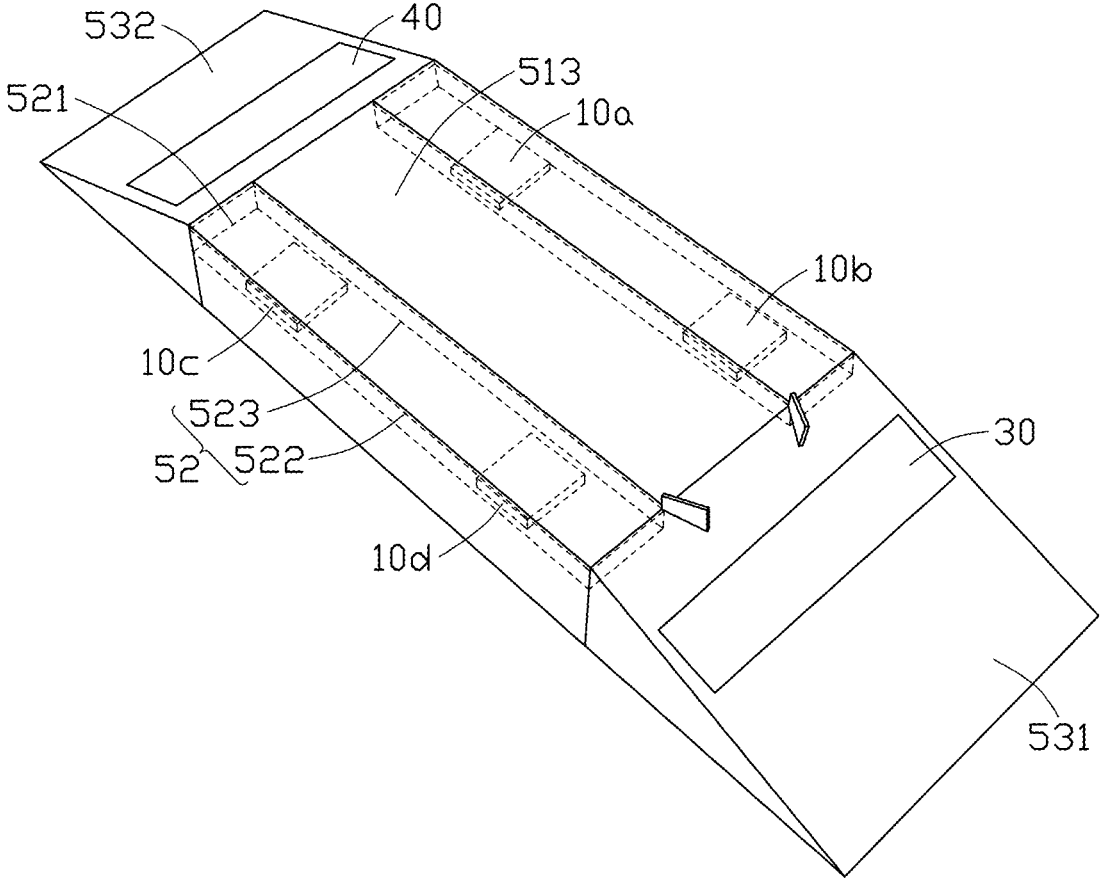
FIG. 5 is a diagram illustrating a third embodiment of a structure of a detection system for detecting an underbody of a vehicle in one application scenario according to the present application.

Referring to FIG. 5, FIG. 5 shows a diagram of a third embodiment of a structure of the detection system 1. By comparing with the second embodiment, the difference is that the bottom collecting module 10 is disposed in the second region 52, and the second region 52 supports the wheels on sides of the vehicle. In detail, the second region 52 includes second covers 522 and second slots 523. The detection platform 50 concaves at the position where the wheels pass along the approaching direction to form two second slots 523. The bottom collecting modules 10 are disposed in the second slots respectively along the approaching direction of the vehicle. The signal emitted or reflected by the wheels entranced into the second slot 523 and then approaching the first signal receiving terminal of the corresponding bottom collecting module 10. The second cover 522 is covered on the second slot 523, and is movably connected with an edge formed the second slot 523, for preventing other objects entering into the second slot 523. Surfaces of the second covers 522 away from the second slot 523 is coplanar with each other, for making the vehicle to drive through the detection platform 50 smoothly. The second cover 522 may be a transparent cover or a non-transparent cover. The transparent second cover 522 is made of reinforced glass. The un-transparent second cover 522 defines a through hole opposite to the first signal receiving terminal. A transparent portion is disposed in the through hole. The transparent portion is made of reinforced glass, and the like. The first signal receiving terminal receives the signal emitted or reflected by the wheel of the vehicle through the through hole or the transparent second cover 522. The first region 51 disposed between the two second regions 52 may include a second projection 513. In detail, the second projection 513 is formed between the two second slot 523. A top surface of the second projection 513 is coplanar with the surface of the second cover 522 away from the second slot 523, for making the vehicle to drive through the second projection 513 smoothly.

In an application scenario, the vehicle approaching the entrance assisting portion 531, the vehicle drives to the starting triggering module 30, the first triggering signal is generated when the pressure received by the starting triggering module 30 is larger than the predefined pressure. The bottom collecting modules 10a, 10b, 10c, and 10d in the second region 52 collect the underbody images of the vehicle in response to the first triggering signal. For example, after the vehicle approaching the second region 52 by assisting with the wheel assisting portion 54, when the vehicle is at the first position, the bottom collecting modules 10*a* and 10*c* collect the image of a front end of a tire pattern of each wheel in the front row, and the bottom collecting modules 10*b* and 10*d* collect the image of a bottom of a tire pattern of each wheel in the front row. When the vehicle is at the second position, the bottom collecting modules 10*a* and 10*c* collect the image of a bottom of a tire pattern of each wheel in the front row, and the bottom collecting modules 10*b* and 10*d* collect the image of a bottom of a tire pattern of each wheel in the back row. When the vehicle approaching the exit assisting portion 532, the vehicle drives to the ending triggering module 40, the second triggering signal is generated when the pressure received by the ending triggering module 40 is larger than the predefined pressure. The bottom collecting modules 10*a*, 10*b*, 10*c*, and 10*d* in the second region 52 stop collecting the images of the vehicle in response to the second triggering signal.

It is understood that, according to the bottom collecting modules 10 disposed in the second slots 523 where the wheels of the vehicle drive through along the approaching direction, the detection system 1 of the embodiment may collects more images of the wheels for making the image of the wheel to be more complete.

Figure 6:
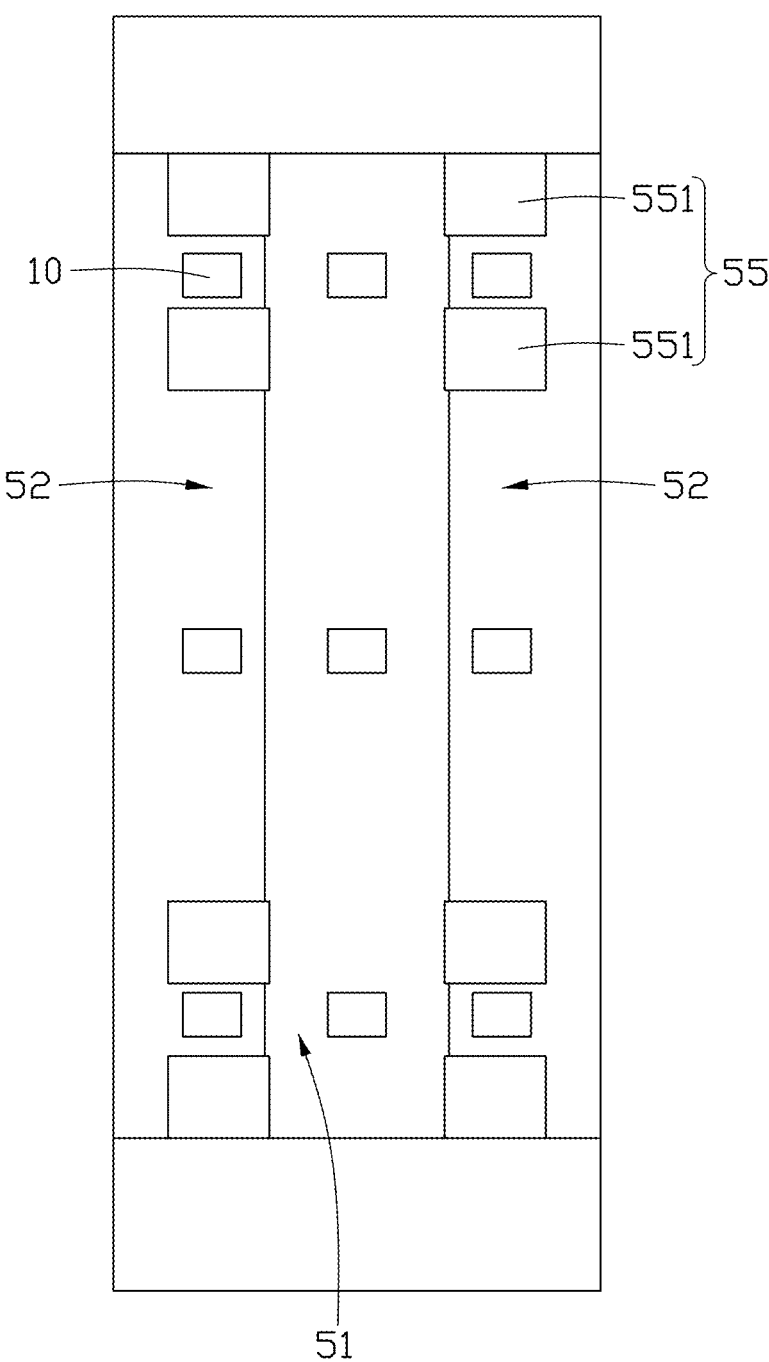
FIG. 6 is a diagram illustrating a fourth embodiment of a structure of a detection system for detecting an underbody of a vehicle in one application scenario according to the present application.

Referring to FIG. 6, by combination with FIGS. 4 and 5, FIG. 6 shows a diagram of a fourth embodiment of a structure of the detection system 1. By comparing with the third embodiment, the difference is that the bottom collecting modules 10 are respectively disposed in the first region 51 and the second region 52. In detail, the first region 51 defines the first slot 511, and the second region 52 defines the second slots 523 and the second covers 522. Some of the bottom collecting modules 10 are disposed in the first slot 511 along the approaching direction of the vehicle, and a rest of the bottom collecting modules are disposed in the second slot 522 along the approaching direction of the vehicle. It is understood that, the detection system 1 may collect a complete chassis image of the vehicle, and also collect a complete tire image of each wheel of the vehicle.

The difference between the third embodiment and the fourth embodiment also is that the detection platform 50 further include a lifting apparatus 55. The lifting apparatus 50 is configured to lift and roll the wheels. The lifting apparatus 55 may be movably mounted in the second region 52, and also may be movably mounted in the first region 51 and the second region 52. It is understood that, the mounting position of the lifting apparatus 55 is related to the position of the wheels of the vehicle when the vehicle is stopped at the detection platform 50. In detail, take the lifting apparatus 55 being movably mounted in the second slot 523 of the second region 52 for example, a loading surface of the lifting apparatus 55 is coplanar with the second cover 522 in the second region 52. The lifting apparatus 55 includes a lifting sensing module. The lifting sensing module is configured to generate a lifting signal when sensing the wheels are at the loading surface of the lifting apparatus 55. The lifting apparatus 55 rises from the second slot 523 for lifting the wheels at a predefined height and rolling the wheels in response to the lifting signal. There are several lifting apparatuses 55. Taking four lifting apparatuses 55 for example, the four lifting apparatuses 55 are respectively disposed in two ends of each second slot 523. Each lifting apparatus 55 corresponding to one wheel includes two rollers 551. The rollers 551 roll along a same direction. A friction of the roller 551 drives the wheels to roll. The different positions of the roller 551 may be set for keeping the wheels on the lifting apparatus 55. For example, the two rollers 551 are distanced from each other at a fifth predefined distance. The fifth predefined distance may be fitted with the wheel being rolled. Or, a rolling direction of the lifting apparatuses 55 corresponding to the wheels in the front row is different from a rolling direction of the lifting apparatuses 55 corresponding to the wheels in the back row. The second slot 523 corresponds to a gap between the two rollers 551, the bottom collecting modules 10 are disposed in the second slot 523. The bottom collecting modules 10 collects the images of the rolling wheel through the gap, and a state of the wheel is determined based on the images of the rolling wheel.

In an application scenario, the starting triggering module 30 senses the vehicle and generates the first triggering signal. The bottom collecting module 10 between the two rollers 551 collects images in response to the first triggering signal. When the wheel is stationary at the lifting apparatus 55, the lifting apparatus 55 senses the wheel and rises up from the second slot 523. The gap is fitted with the gap between the two rollers 551. The lifting apparatus 55 carries the wheel at the predefined height, the rollers 551 rolls, for driving the wheel to roll. The bottom collecting modules 10 disposed in the gap collect the wheel image of the rolling wheel.

It is understood that, the lifting apparatus 55 may lift and roll the wheel, for making the signals emitted or reflected by the wheels at different positions entering into the first signal terminal, therefore the bottom collecting module 10 may collect more the wheel images of the wheel for making the image of the wheel to be more complete.

It is understood that, the detection platform 50 of the first to fourth embodiments may be movably mounted on the way, which is convenience to a manufacture for mounting the detection system 1 at any places. The detection platform 50 may include several portions being removably connected, such as, the driving assisting portion 53, the wheel assisting portion 54, the first cover 521, and the second covers 522, and so one. It is convenience to the manufacturer for replacing the portions and components in each module. For example, the manufacturer may open the first cover 511 for replacing the bottom collecting module 10. In addition, by the detection platform 50, the manufacturer uses an installation measure which reduces a damage to a mounting place, such as digging. A mounting operation of the detection platform 50 becomes simpler.

Figure 7:
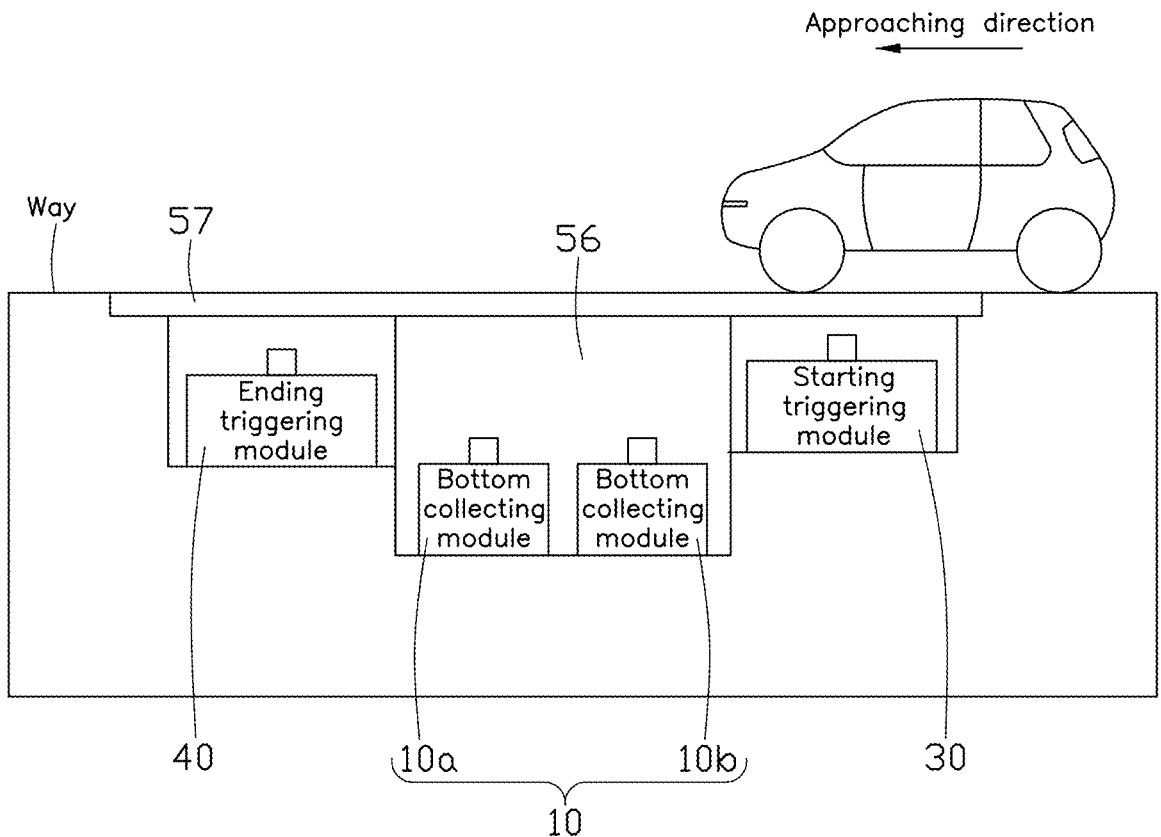
FIG. 7 is a diagram illustrating a fifth embodiment of a structure of a detection system for detecting an underbody of a vehicle in one application scenario according to the present application.

Referring to FIG. 7, FIG. 7 shows a diagram of a fifth embodiment of a structure of the detection system 1. By comparing with the first embodiment, the bottom collecting module 10 of the detection system 1 in the fifth embodiment is buried in the way. In detail, one or more third slot 56 is defined at the road surface by digging down the road surface. The bottom collecting modules 10 are distanced disposed in the one or more third slot 56 along the approaching direction. The first signal receiving terminal is perpendicular to the road surface and/or is adjustably disposed on the corresponding bottom collecting module 10. In one embodiment, there is a third transparent cover 57 at the road surface corresponding to the bottom collecting module 10 for making the first signal receiving terminal to receive the signal of the bottom of the vehicle. The third transparent cover 57 is made of enforced glass. A surface of the third transparent cover 57 for loading the vehicle is coplanar with the road surface, for making the vehicle to drive through smoothly. In another embodiment, a through hole (not shown) is defined at the road surface corresponding to the first signal receiving terminal. Or, there is a third non-transparent cover 57 at the road surface corresponding to the bottom collecting module 10. A surface of the third non-transparent cover 57 for loading the vehicle is coplanar with the road surface, for making the vehicle to drive through smoothly. The third non-transparent cover 57 defines a through hole (not shown) facing to the first signal receiving terminal. There is a transparent portion disposed in the through hole. The transparent portion is made of enforced glass. The first signal receiving terminal receives the signal emitted or reflected by the underbody of the vehicle through the through hole.

In one embodiment, the starting triggering module 30 and the ending triggering module 40 is buried in the way. In detail, the starting triggering module 30 is disposed in the third slot 56 of the first terminal which the vehicle moves towards to, the ending triggering module 40 is disposed in the third slot 56 of the second terminal which the vehicle moves away from. The second signal receiving terminal may be perpendicular to the road surface of the way, or be angled with the road surface at a predefined angle on the starting triggering module 30 or the ending triggering module 40. In one embodiment, the road surface facing to the starting triggering module 30 and the ending triggering module 4 defines a third transparent cover 57, for making the first signal receiving terminal to receive the signal emitted or reflected by the underbody of the vehicle. The transparent cover 57 is made of enforced glass. A surface of the third transparent cover 57 for loading the vehicle is coplanar with the road surface, for making the vehicle to drive through smoothly. In another embodiment, a through hole (not shown) is defined at the road surface corresponding to the first signal receiving terminal. Or, there is a third non-transparent cover 57 at the road surface corresponding to the starting triggering module 30 and the ending triggering module 40. A surface of the third non-transparent cover 57 for loading the vehicle is coplanar with the road surface, for making the vehicle to drive through smoothly. The third non-transparent cover 57 defines a through hole (not shown) facing to the first signal receiving terminal. There is a transparent portion disposed in the through hole. The transparent portion is made of enforced glass. The first signal receiving terminal receives the signal emitted or reflected by the underbody of the vehicle through the through hole. In another embodiment, the starting triggering module 30 and the ending triggering module 40 are disposed in the way, the detail disposed manner refers to the first embodiment.

In an application scenario, the vehicle driving along the approaching direction, when the vehicle drives to the starting triggering module 30, the pressure received by the starting triggering module 30 is larger than the predefined pressure, the first triggering signal is generated. The bottom collecting module 10a and 10b response to the first triggering signal for collecting images. The second signal receiving terminals of the bottom collecting module 10a and 10b being perpendicular to the road surface receive signal emitted or reflected by the underbody of the vehicle. According to the moving of the vehicle, the second signal receiving terminal receives different signals to form the chassis images and the wheel images when the vehicle is at different positions. When the vehicle drives to the ending triggering module 40, the pressure received by the ending triggering module 40 is larger than the predefined pressure, the second triggering signal is generated. The bottom collecting module 10a and 10b response to the second triggering signal for stopping collecting images. The processing module 20 determines that whether there is an oil leakage of the chassis of the vehicle based on the chassis images and the wheel images when the vehicle is at different positions.

It is understood that, the detection system of the fifth embodiment, is combined with a structure of an application scenario, without the detection platform 50. The vehicle smoothly drives on the ground set with the detection system 1. When detecting the vehicle, the vehicle is not easily rocked. The bottom collecting module 10 is able to collect more images of the underbody of the vehicle which are more accurate. The processing module 20 may identify the state of the underbody of the vehicle more accurately.

Those skilled in the art will recognize that the above described embodiments are only intended to illustrate the invention and are not intended to limit the invention, and numerous possible modifications and variations within the spirit of the invention will fall within the scope of the invention.

What is claimed is:

1. A detection system comprises:

at least one bottom collecting module, disposed on a ground, and configured to face to an underbody of the vehicle and collect an underbody image of the vehicle; and a processing module, configured to determine whether the underbody of the vehicle is in an abnormal state based on the underbody image of the vehicle;

wherein the detection system further comprises:

a detection platform disposed on the ground; the detection platform comprises a first region and two second regions; the first region is disposed between the two second region; the bottom collection regions are disposed in the first region and/or the second region, and are disposed along the approaching direction of the vehicle in the sequence;

the first region defines a first slot; each second region defines a second slot;

the bottom collecting modules are disposed in the first slot and the second slot respectively, and are disposed in a sequence along the approaching direction of the vehicle;

signals emitted or reflected by the underbody of the vehicle approaching the first slot and the second slot and then approaching the bottom collecting module, for making the bottom collecting module to collect the underbody image.

2. The detection system of claim 1, wherein the detection module further comprises:

a starting triggering module, configured to generate a first triggering signal when the vehicle approaching the bottom collecting module; and an ending triggering module, configured to generate a second triggering signal when the vehicle drives away from the bottom collecting module;

wherein the bottom collecting module responses to the first triggering signal for collecting the underbody image of the vehicle; the bottom collecting module further responses to the second triggering signal for stopping collecting the underbody image of the vehicle.

3. The detection system of claim 2, wherein the starting triggering module and the ending triggering module are pressure sensors; when the vehicle drive to the starting triggering module and/or the ending triggering module, the pressure sensed by the starting triggering module and/or the ending triggering module is larger than a predefined pressure, the starting triggering module and/or the ending triggering module generates the first and/or second triggering signal.

4. The detection system of claim 1, the detection system further comprises a plurality of bottom collecting modules, and the plurality of bottom collecting modules are disposed along an approaching direction of the vehicle to the detection system in a sequence.

5. The detection system of claim 1, wherein the second region is further configured to support wheels of the vehicle; the first region comprises a first cover; the first cover is movably connected with an edge formed the first slot; the first cover prevents other objects entering into the first slot.

6. The detection system of claim 1, wherein each second region comprises a second cover; the second cover is movably connected with an edge formed the second slot; the second cover is configured to support the wheels of the vehicle.

7. The detection system of claim 6, wherein the detection system further comprises multiple lifting apparatuses in the second region; each of the multiple lifting apparatuses is configured to lift and roll the wheels; each of the multiple lifting apparatuses is configured to rise from the second slot for lifting the wheels at a predefined height and rolling the wheels.

8. The detection system of claim 7, wherein the detection system further comprises four lifting apparatuses; each lifting apparatus corresponds to a wheel; each lifting apparatus comprises two rollers; the two rollers are distanced from each other to from a gap; the bottom collecting module is disposed in the gap.

9. The detection system of claim 1, wherein the detection system further comprises a lifting apparatus; the lifting apparatus is movably mounted on an edge of the first region and/or the second region; the lifting apparatus is configured to lift and roll the wheels.

10. The detection system of claim 1, wherein the detection system further comprises a driving assisting portion; the driving assisting portion is connected with an edge of the second region; an end of the driving assisting portion is coplanar with the second region, and an opposite end of the driving assisting portion is connected with a road surface of the way, the wheels is assisted by the driving assisting portion to close to or away from the second region from the road surface.

11. The detection system of claim 1, wherein the detection system further comprises wheel assisting portions in an end of the second region which the vehicle moves towards to; each wheel assisting portion is configured to guide the wheels to be closed to the second region.

12. The detection system of claim 1, wherein the detection system further comprises side collecting modules; each side collecting module is disposed exterior to the detection platform, and is configured to collect underbody image of the vehicle from a side of the vehicle.

13. The detection system of claim 12, wherein the side collecting modules are symmetrically disposed on disposed on two sides of the detection platform.

14. The detection system of claim 1, wherein the underbody image comprises chassis images and wheel images; when the vehicle drives through the detection platform, the bottom collecting module collects the underbody images from different positions when the vehicle is at different positions of the detection platform.

* * * * *